United States Patent
Lv et al.

(10) Patent No.: US 12,141,596 B2
(45) Date of Patent: Nov. 12, 2024

(54) WORKING WITH APPLICATIONS AND FILES OF MULTIPLE REMOTE DESKTOPS ON A SINGLE REMOTE DESKTOP

(71) Applicant: VMware, Inc., Palo Alto, CA (US)

(72) Inventors: Lin Lv, Beijing (CN); Yanchao Zhang, Beijing (CN); Yang Liu, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 89 days.

(21) Appl. No.: 17/343,963

(22) Filed: Jun. 10, 2021

(65) Prior Publication Data
US 2022/0382572 A1 Dec. 1, 2022

(30) Foreign Application Priority Data

May 28, 2021 (WO) ................ PCT/CN2021/096680

(51) Int. Cl.
*G06F 9/451* (2018.01)
*G06F 9/455* (2018.01)

(52) U.S. Cl.
CPC .......... *G06F 9/45545* (2013.01); *G06F 9/452* (2018.02)

(58) Field of Classification Search
CPC ............................. G06F 9/45545; G06F 9/452
See application file for complete search history.

(56) References Cited

U.S. PATENT DOCUMENTS

| | | | |
|---|---|---|---|
| 7,657,837 B2 | 2/2010 | Shappir et al. | |
| 8,972,485 B1 * | 3/2015 | French | G06F 9/5044 709/203 |
| 9,628,436 B1 * | 4/2017 | Britt | H04L 61/58 |
| 2009/0293066 A1 * | 11/2009 | Low | G06F 9/548 719/316 |
| 2010/0269135 A1 * | 10/2010 | Hulse | H04N 21/4782 715/764 |
| 2012/0324365 A1 * | 12/2012 | Momchilov | H04L 67/01 715/738 |
| 2013/0007090 A1 * | 1/2013 | Sankararaman | G06F 9/46 709/201 |

(Continued)

OTHER PUBLICATIONS

VMware, Inc. "VMware Horizon Client for Linux Installation and Setup Guide," VMware Horizon Client for Linux 5.4, Mar. 2020, 127 pages.

*Primary Examiner* — Emerson C Puente
*Assistant Examiner* — Jonathan R Labud
(74) *Attorney, Agent, or Firm* — Kim & Stewart LLP (57) ABSTRACT

Remote desktop services are accessed by a remote desktop from a pool of remote desktops. When the remote desktop detects a user request to launch an application and determines that the application to be launched is from another remote desktop, the remote desktop establishes a connection with the other remote desktop to launch and display the application seamlessly. In addition, the remote desktop retrieves drive configuration data indicating drives or folders that are shared by each of the remote desktops in the pool and creates a mapping of the shared drives and folders based on the drive configuration data. In response to a user request to open a shared drive or folder of the second remote desktop, the remote desktop establishes a connection between the first remote desktop and the second remote desktop to acquire contents of the shared drive or folder.

19 Claims, 7 Drawing Sheets

(56) References Cited

U.S. PATENT DOCUMENTS

| | | | |
|---|---|---|---|
| 2013/0067100 A1* | 3/2013 | Kuzin | H04L 67/08 709/228 |
| 2014/0304326 A1* | 10/2014 | Wesley | H04L 67/1095 709/203 |
| 2016/0056975 A1* | 2/2016 | Marin | H04L 67/10 709/220 |
| 2020/0218429 A1* | 7/2020 | Yu | G06F 3/0481 |

* cited by examiner

WORKING WITH APPLICATIONS AND FILES OF MULTIPLE REMOTE DESKTOPS ON A SINGLE REMOTE DESKTOP

CROSS-REFERENCE

This application is based upon and claims the benefit of priority from International Patent Application No. PCT/CN2021/096680, filed on May 28, 2021, the entire contents of which are incorporated herein by reference.

BACKGROUND

In a computing environment that provides remote desktops, a user may launch multiple remote desktops and use them concurrently to fulfill different tasks. There are some pain points, however, when users work with multiple remote desktops, such as frequent switching between the remote desktops to access files and applications located in different remote desktops. When a remote desktop that a user is connected to is running slow, the user may switch the connection to a new remote desktop to run workloads on the new remote desktop. This involves launching the new remote desktop and then either transferring the working files from the current remote desktop to the new remote desktop or sharing the working files between the current remote desktop to the new remote desktop.

Using multiple monitors may alleviate some of the difficulties in working with multiple remote desktops concurrently, but the pain points still remain. Furthermore, users may not always have access to multiple monitors, for example, when the users are working from home or while traveling.

SUMMARY

One or more embodiments enable users who have connection access to multiple remote desktops to view and open files and search for and launch applications from a single remote desktop seamlessly even though the files and the applications are located in any one of the multiple remote desktops.

In one embodiment, the user is able to access remote desktop services from a pool of remote desktops that the user is entitled to connect with, even though the user is connected to only one of the remote desktops. The method of accessing remote desktop services from the pool of remote desktop pools includes the steps of: detecting by a first remote desktop in the pool of remote desktops, a user request received from a remote desktop client to launch an application; determining that the application to be launched is installed in a second remote desktop in the pool of remote desktops; establishing a connection between the first remote desktop and the second remote desktop to launch the application in the second remote desktop; and delivering outputs of the application by the first remote desktop to the remote desktop client based on inputs received by the first remote desktop from the remote desktop client. The outputs of the application are generated by the application running in the second remote desktop based on the inputs received by the first remote desktop from the remote desktop client, and the outputs of the application and the inputs from the remote desktop client are exchanged between the first remote desktop and the second remote desktop through the established connection.

Further embodiments of the present invention include a non-transitory computer readable storage medium that includes instructions that enable a processing unit to implement one or more aspects of the above method, as well as a remote desktop system configured to implement one or more aspects of the above method.

DETAILED DESCRIPTION

Figure 1:
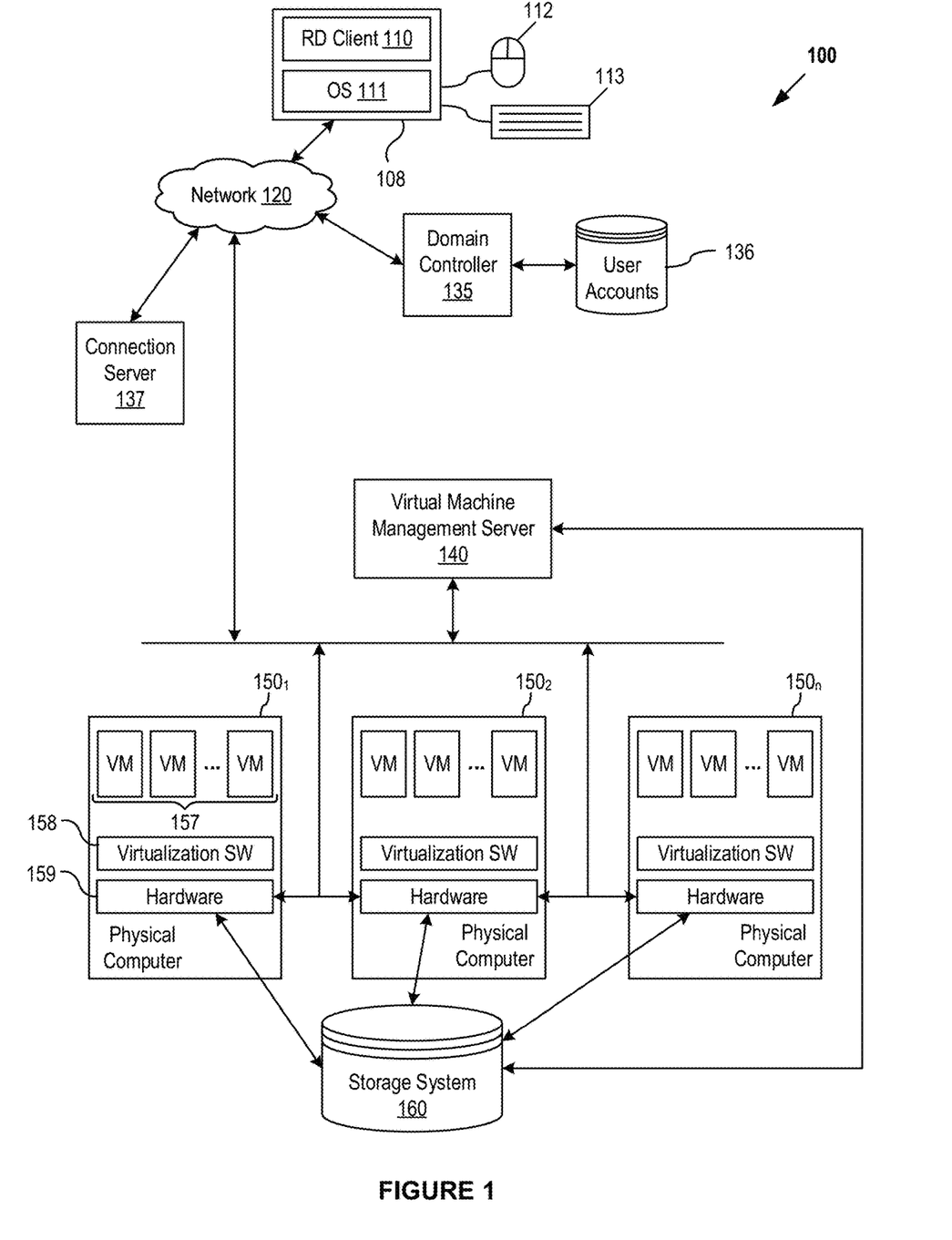
FIG. 1 illustrates components of a virtualized desktop infrastructure (VDI) in which one or more embodiments may be implemented.

FIG. 1 illustrates components of a virtualized desktop infrastructure (VDI) 100 (also referred to as a remote desktop computer system) in which one or more embodiments may be implemented. In VDI 100, remote desktop client software programs (also referred to as "RD clients" for short) run on operating systems of local computing devices (also referred to as "client devices" for short). In the embodiment illustrated in FIG. 1, RD client 110 runs on top of operating system (OS) 111 of client device 108, which has attached thereto a set of input devices including a mouse 112 and a keyboard 113. For simplicity, other client devices are not illustrated in FIG. 1, and they may employ a keyboard and/or a touchscreen as an input device.

RD clients provide an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With RD clients, users can access desktops running in a remote data center through network 120, from any location, using a general purpose computer running a commodity operating system and a RD client software program such as VMware Horizon®, or a special purpose thin client such as those available from Dell, HP, NEC, Sun Microsystems, Wyse, and others.

VDI 100 includes a domain controller 135, such as Microsoft Active Directory®, that manages user accounts 136 including user log-in information, and a connection server 137 that manages connections between RD clients and desktops running in virtual machines 157 or other platforms. Domain controller 135 and connection server 137 may run on separate servers or in separate virtual machines running on the same server or different servers. In the embodiments of the present invention illustrated herein, desktops are running in virtual machines 157 and virtual machines 157 are instantiated on a plurality of physical computers $150_1$, $150_2$, ..., $150_n$, each of which includes virtualization software 158 and hardware 159, is controlled by a virtual machine management server 140, and is coupled to a shared persistent storage system 160.

A particular configuration of the virtualized desktop infrastructure is described above and illustrated in FIG. 1, but it should be recognized that one or more embodiments may be practiced with other configurations of the virtualized desktop infrastructure.

Figure 2:
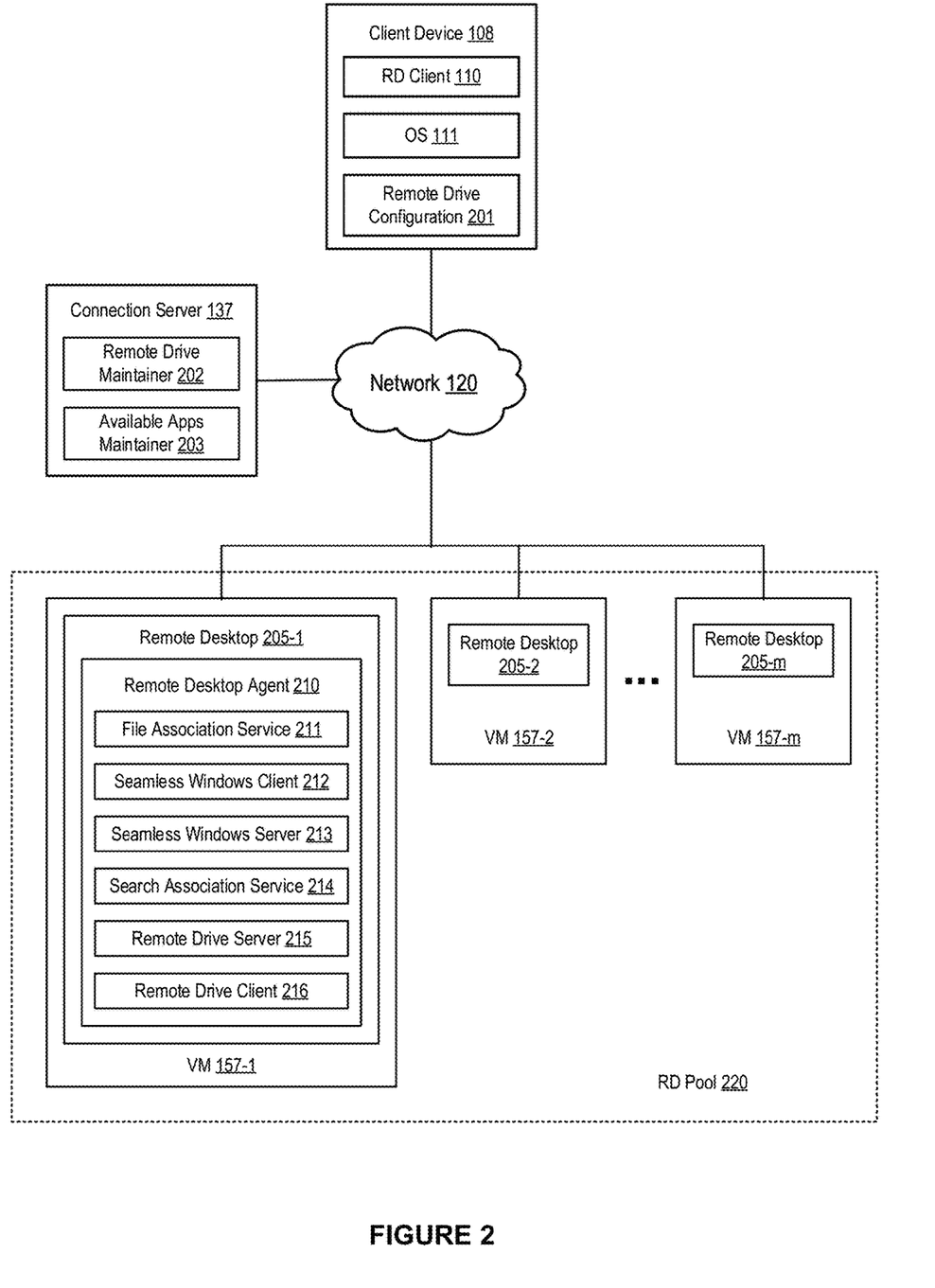
FIG. 2 illustrates software components of a client device, a connection server, and a pool of remote desktops of the VDI, that enable files and applications of the remote desktops to be accessible by one of the remote desktops.

FIG. 2 illustrates software components of client device 108, connection server 137, and remote desktops 205-1 to 205-m (running respectively in VMs 157-1 through 157-m), that enable files and applications of all of the remote desktops to be accessible by any one of the remote desktops. For simplicity, only the software components of remote desktop 205-1 are depicted in FIG. 2. It should be understood that the other remote desktops 205-2 to 205-m are configured with the same software components. VMs 157-1 through 157-m are instantiated on physical computers, which may be located in the same data center or different data centers. In addition, two or more of VMs 157-1 through 157-n may be instantiated on the same physical computer.

Figure 3:
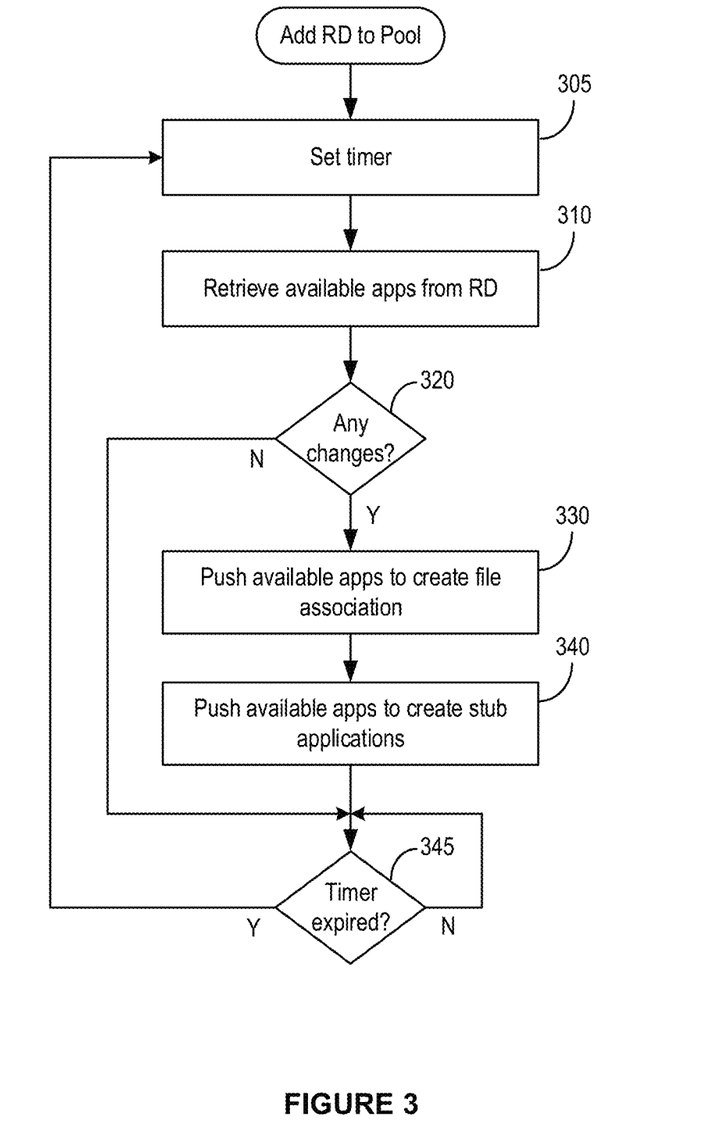
FIG. 3 is a flow diagram that illustrates steps of a method of adding a remote desktop to the pool of remote desktops.

In the embodiments, a user may log into any one of the remote desktops in a remote desktop (RD) pool 220. Different RD pools are defined for different users, and each RD pool represents a group of remote desktops that a particular user is entitled to (i.e., has permission to connect with). Each time a remote desktop is added to a RD pool, the method depicted in FIG. 3 is carried out. RD pool 220 depicted in FIG. 2 is for one particular user, and has m remote desktops, each hosted by a VM.

When a user logs into one of the remote desktops in RD pool 220, the user is prompted by connection server 137 for login credentials and to select one of the remote desktops with which to connect. If proper credentials are input, RD client 110 establishes an active session with a remote desktop agent of the selected remote desktop (e.g., remote desktop agent 210 of remote desktop 205-1). Connection server 137 also prompts the user to designate for each remote desktop in RD pool 220 what disk or folder is to be shared with other remote desktops in RD pool 220. This information is saved as remote drive configuration 201 and transmitted to connection server 137. A service running in connection server 137, which is depicted in FIG. 2 as remote drive maintainer 202, stores this information for each user.

Another service that is depicted in FIG. 2 as running in connection server 137 is available apps maintainer 203. This service monitors and tracks the latest state of applications that are installed in each remote desktop of each user, and communicates this information to file association services running in the individual remote desktops. In this manner, any one of the remote desktops for a particular user, through its respective file association service, can communicate with available apps maintainer 203 to acquire the latest state of applications that are installed in the remote desktops of that user.

For example, each remote desktop in RD pool 220 implements a file association service 211, which communicates with available apps maintainer 203 to retrieve the latest state of applications installed on other remote desktops in RD pool 220. Upon acquiring this information, the remote desktop creates/updates file association for its files which may be opened using applications installed on the other remote desktops by registering RD agent 210 as a file handler for these files. In registering RD agent 210 as a file handler, file association service adds, for each such application, a "program identifier" in HKEY_CURRENT_USER/Software/Classes with proper application information, such as application name and the ID of the other remote desktop in which the application is installed. With this file association created or updated in a remote desktop, when the user of the remote desktop makes a request to open a file with an application installed in another remote desktop, RD agent 210 calls seamless window client 212 (which is described below) to handle this request.

When a user of a remote desktop tries to launch an application on another remote desktop, e.g., by opening a file with such an application or directly launching the application, seamless window client 212, acquires the application name and the ID of the other remote desktop from RD agent 210, and then calls connection server 137 to request a connection with a seamless window server on the other remote desktop. With the approval of connection server 137, seamless window client 212 communicates with the seamless window server on the other remote desktop to launch and display the application seamlessly.

Seamless window server 213 on remote desktop 205-1 communicates with the seamless window client on another remote desktop to launch and display the application seamlessly on the other remote desktop. With the seamless window client and the seamless window server implemented in each of the remote desktops of RD pool 220, applications running in any one of the remote desktops in RD pool 220 can be made to appear like applications running locally on another one of the remote desktops in RD pool 220. In one embodiment, the seamless window client and the seamless window server of VMware Horizon® are implemented in the remote desktops described herein to provide the seamless window feature. In another embodiment, the seamless window feature disclosed in U.S. Pat. No. 7,657,837, the entire contents of which are incorporated by reference herein, is implemented in the remote desktops described herein.

Each remote desktop in RD pool 220 also includes a search association service, which is responsible for communicating with connection server 137 to retrieve the latest state of applications installed on other remote desktops in RD pool 220. Upon acquiring this information, the search association service of a remote desktop (e.g., search association service 214 of remote desktop 205-1) creates/updates stub applications (each corresponding to one of the applications installed on other remote desktops in RD pool 220) under the application search path of the remote desktop's operating system. As a result, when a user of the remote desktop searches applications by application name, the stub applications are returned as the search results in lieu of the matched applications on other remote desktops in RD pool 220. When the user clicks on the stub application, the remote desktop agent will call the seamless window client to initiate the process for launching and displaying the matched application as described above.

When a user connects to one of the remote desktops in RD pool 220, a remote drive server of the remote desktop (e.g., remote drive server 215 of remote desktop 205-1) communicates with remote drive maintainer 202 on connection server 137 to retrieve remote drive configurations of the other remote desktops in RD pool 220, and creates mapped drives and folders so that these mapped drives and folders can be displayed as being accessible on the remote desktop. The remote drive server is also responsible for establishing a connection with one of the remote drive clients of the other remote desktops in RD pool 220, e.g., by submitting a request for the connection to connection server 137 and obtaining approval for the connection from connection server 137, when a mapped drive or folder is selected for viewing. After the connection is made, a remote drive client of the other remote desktop shares the contents of the mapped drive or folder with the remote drive server so that the contents can be displayed seamlessly at the remote desktop where the remote drive server is running. Similarly, when a remote drive server of another remote desktop in RD pool 220 establishes a connection with remote desktop 205-1, remote drive client 216 of remote desktop 205-1 shares the contents of the mapped drive or folder with the remote drive server so that the contents can be displayed seamlessly at the remote desktop where the remote drive server is running.

FIG. 3 is a flow diagram that illustrates steps of a method of adding a remote desktop to a pool of remote desktops. The steps of this method are carried out by connection server 137 when a remote desktop is added to a remote desktop pool (e.g., RD pool 220). After the remote desktop is added, steps 310, 320, 330, and 340 are repeated periodically. Therefore, the method of FIG. 3 begins at step 305 at which connection server 137 sets a timer for the remote desktop being added, e.g., 24 hours. After the timer expires, which is detected by connection server 137 at step 345, steps 310, 320, 330, and 340 are repeated.

At step 310, connection server 137 retrieves a list of installed applications from the remote desktop. Then, at step 320, connection server 137 checks to see if there are any changes. If there are changes, steps 330 and 340 are executed. If there are no changes, steps 330 and 340 are skipped and step 345 is executed at which connection server 137 waits for the expiration of the timer before returning to step 305.

At step 330, connection server 137 pushes the installed applications on the remote desktop to all other remote desktops in the remote desktop pool for the other remote desktops to create/update file association for these applications. Then, at step 340, connection server 137 pushes the installed applications on the remote desktop to all other remote desktops in the remote desktop pool for the other remote desktops to create/update stub applications corresponding to the installed applications. After step 340, step 345 is executed at which connection server 137 waits for the expiration of the timer before returning to step 305.

Figure 4:
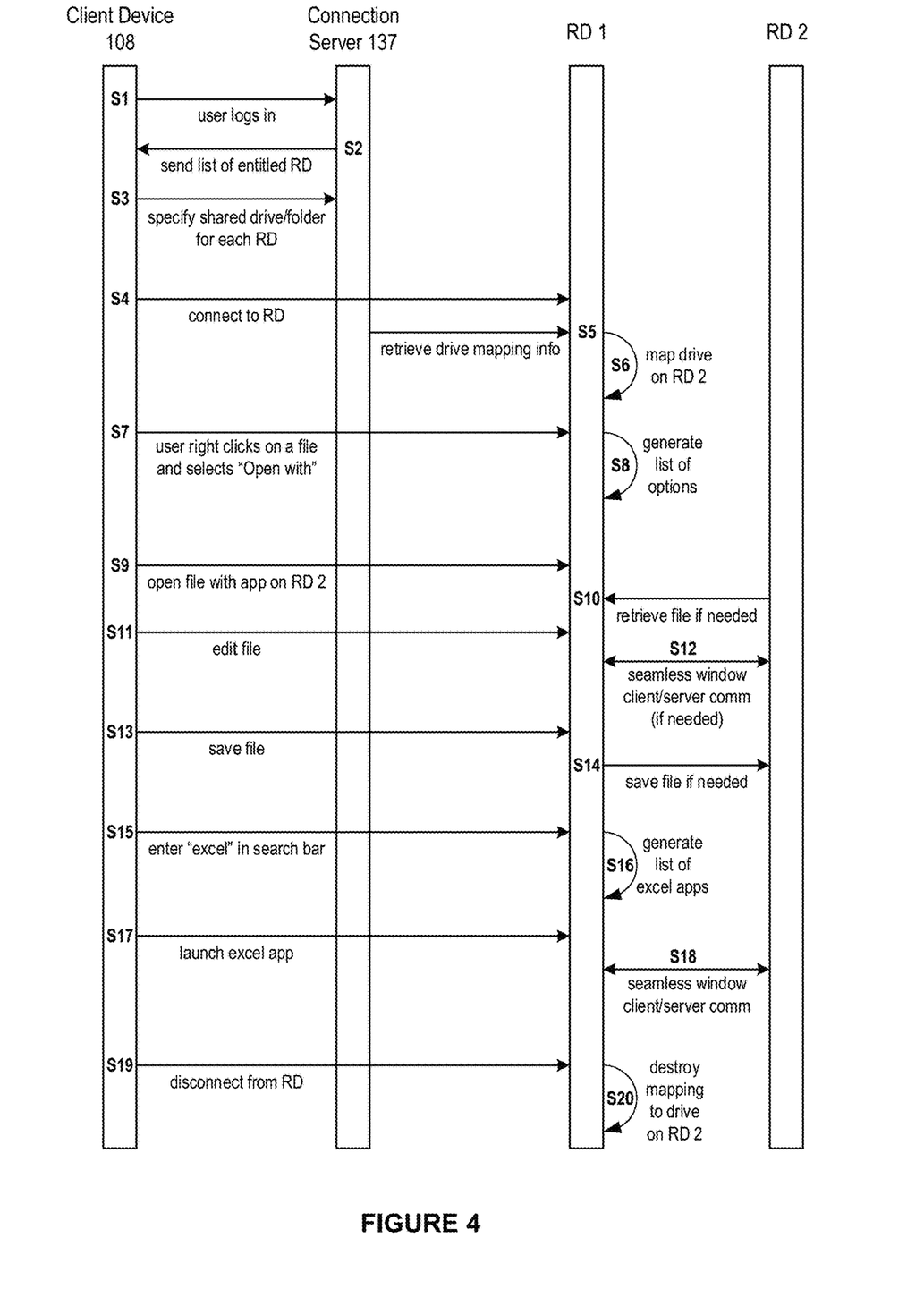
FIG. 4 is a command sequence diagram that depicts a flow of commands that are issued when files and applications are accessed by one of the remote desktops in the pool from another one of the remote desktops in the pool.

FIG. 4 is a command sequence diagram that depicts a flow of commands that are issued when files and applications are accessed by one of the remote desktops in a remote desktop pool from another one of the remote desktops in the remote desktop pool. In the example depicted in FIG. 4, the remote desktop that the user (which is represented by client device 108) is connected to is shown as remote desktop 1 (RD 1) and the remote desktop from which a file or an application is accessed is shown as remote desktop 2 (RD 2). Also, remote desktop 2 represents any one of the other remote desktops in the remote desktop pool from which a file or an application can be accessed by remote desktop 1.

The first command depicted in FIG. 4 is user login at step S1. The user enters login credentials at client device 108 and connection server 137 communicates with domain controller 135 to perform user authentication based on the login credentials supplied by the user. If the user authentication succeeds, connection server 137 at step S2 returns a list of remote desktops that the user is entitled to connect with. In the example given herein, these remote desktops are the same as the remote desktops in the remote desktop pool. For each remote desktop on the list, the user at step S3 specifies drive and/or folder of that remote desktop that is to be shared with the remote desktops in the remote desktop pool. The user-specified information of the shared drive/folder is stored as remote drive configuration 201 and transmitted to connection server 137, which stores this information for the user.

Another step that is carried out at client device 108 upon successful user authentication is user selection of one of the remote desktops to connect with. This step is step S4 in FIG. 4 and results in an active session being established between RD client 110 and the RD agent of the selected remote desktop. After this active session is established, the remote drive server of the selected remote desktop at step S5 communicates with remote drive maintainer 202 on connection server 137 to retrieve remote drive configurations of the other remote desktops in the remote desktop pool, and at step S6 creates mappings of the shared drives and folders.

Figure 5:
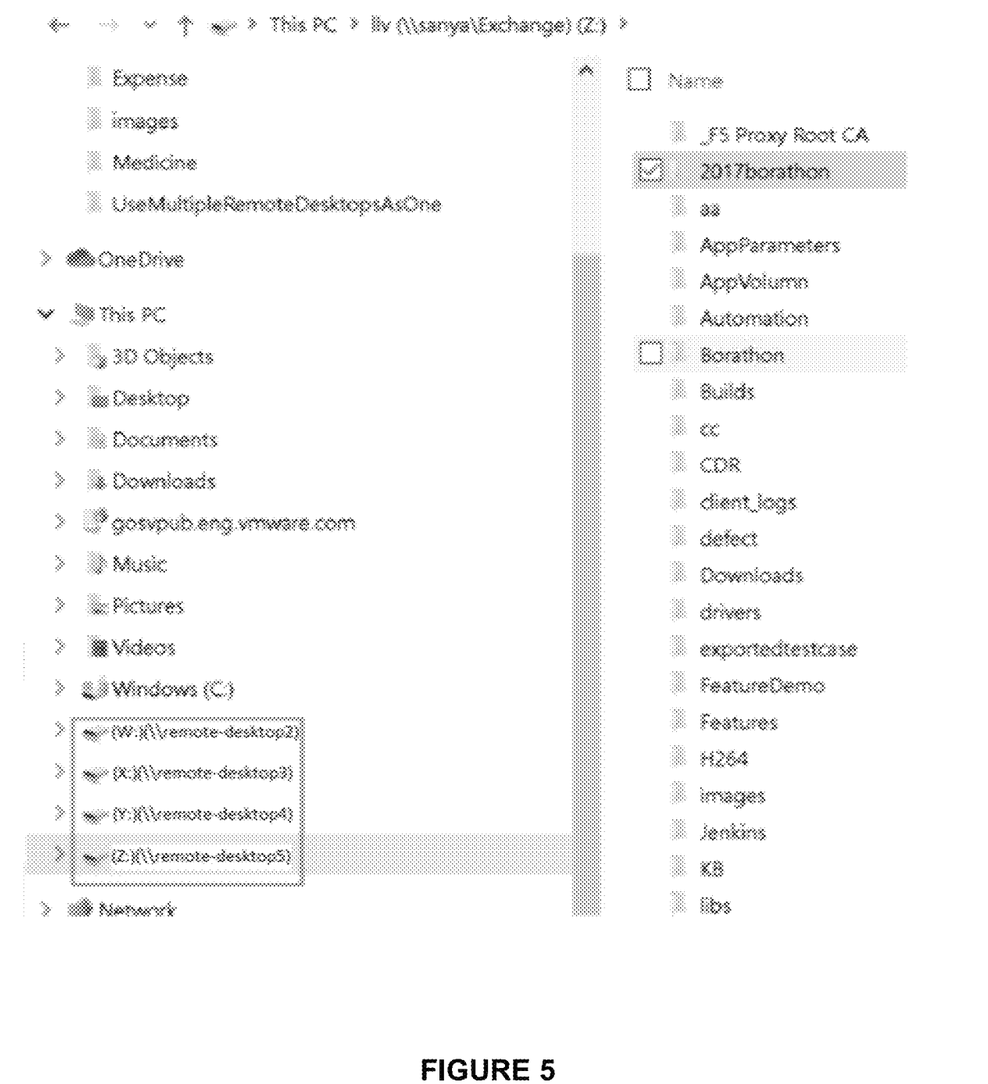
FIG. 5 is an example of an interface that is displayed in response to a user request to view the files accessible by one of the remote desktops in the pool.

FIG. 5 is an example of an interface that is displayed in response to a user request to view the files accessible by one of the remote desktops in the remote desktop pool (in this example, remote desktop 1). In the example of the interface of remote desktop 1 depicted in FIG. 5, shared drives of four other remote desktops in the remote desktop pool, namely remote desktops 2, 3, 4, and 5, are shown as being accessible from the interface of remote desktop 1. When a mapped drive or folder is selected for viewing, the remote drive server of remote desktop 1 establishes a connection with the remote drive client of the other remote desktop (e.g., one of remote desktops 2, 3, 4, and 5) and the remote drive client of the other remote desktop shares the contents of the mapped drive or folder so that these contents (e.g., listing of files) can be displayed seamlessly at remote desktop 1.

Step S7 of in FIG. 4 represents a right click on a file that is displayed on a file browser of remote desktop 1 followed by a selection of the "Open with" option. The file may be a file that is stored in a local drive or folder of remote desktop 1 or one of the files in the mapped drive or folder of another remote desktop. In response to the right click followed by the selection of the "Open with" option, the file association service of remote desktop 1 at step S8 generates a list of applications with which the file can be opened.

Figure 6:
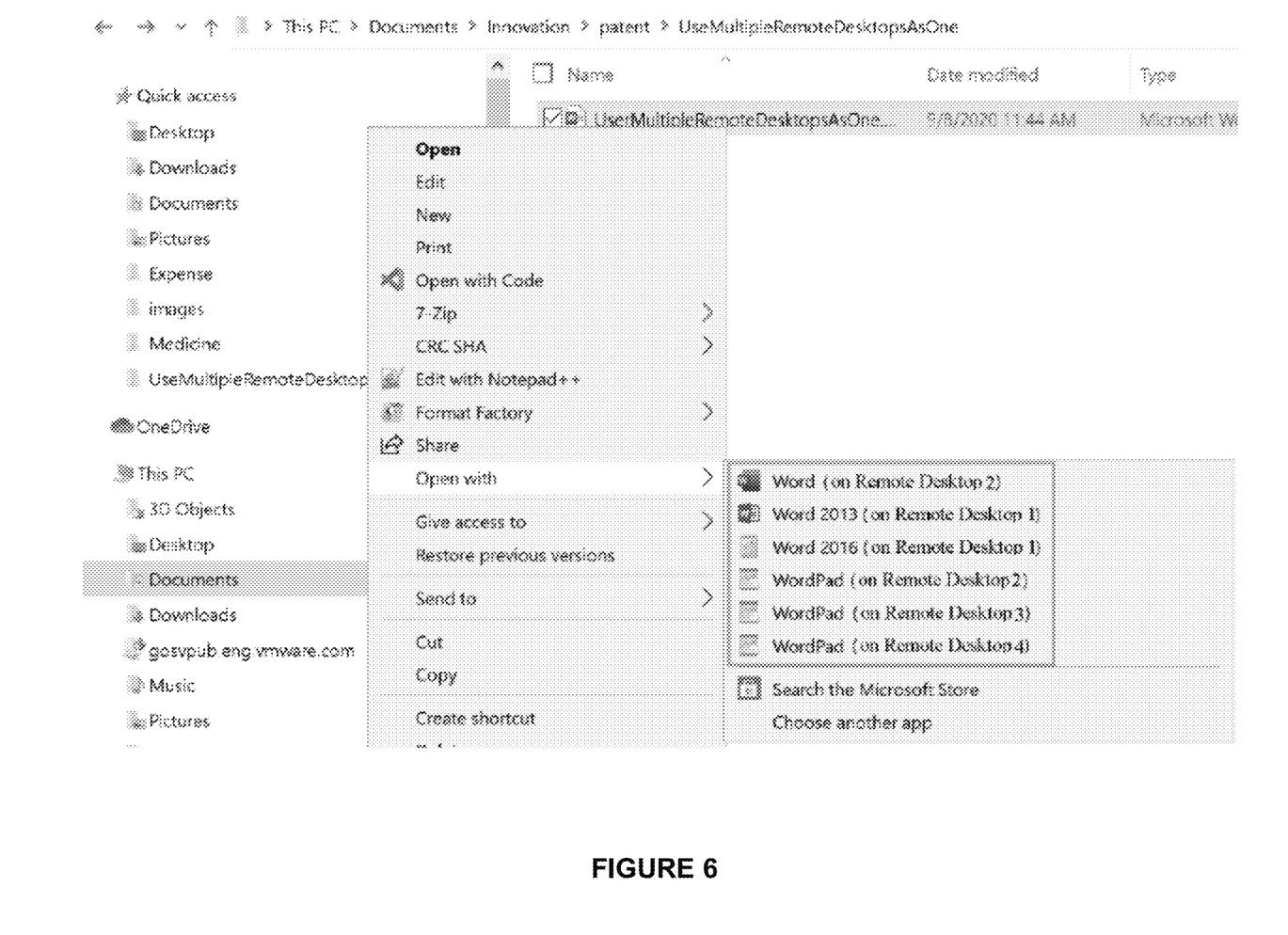
FIG. 6 is an example of an interface that is displayed in response to a right click by the user on one of the files accessible by one of the remote desktops in the pool, followed by a selection of the "Open with" option.

FIG. 6 is an example of an interface that is displayed in response to a right click by the user on one of the files accessible by one of the remote desktops in the pool, followed by a selection of the "Open with" option. In the example of the interface of remote desktop 1 depicted in FIG. 6, the file may be opened with two older versions of a Microsoft Word® application in remote desktop 1, a current version of the Microsoft Word® application in remote desktop 2, and a Microsoft WordPad® application in remote desktops 2, 3, and 4.

At step S9, the user selects one of the options generated at step S8. If the selection is for an application in remote desktop 1, the opening of the file is handled in a conventional way. However, if the selection is for an application in another remote desktop, e.g., remote desktop 2, the remote desktop agent of remote desktop 1, as the registered file handler for the file, determines the location of the application (e.g., ID of the other remote desktop in which the application is installed) and establishes a seamless window connection with the other remote desktop to launch the application in the other remote desktop as further described below.

User actions also includes making edits to the file (step S11) and saving the file (step S13). In response to the user actions, remote desktop 1 performs steps S10, S12, and S14, if needed. For example, if the file that is opened is a file stored in a shared drive or folder of remote desktop 2, steps S10 and S14 are performed by remote drive server of remote desktop 1 communicating with remote drive client of remote desktop 2. At step S10, remote desktop 1 retrieves the file and all user edits to the file will be saved locally at remote desktop 1. Then, at step S14, in response to a user command to save the file, remote desktop 1 transmits the then current version of the file to remote desktop 2 for storage at remote desktop 2.

As mentioned above, if the application that is launched to open the file is an application installed in remote desktop 2, step S12 is performed by seamless window client of desktop 1 and the seamless window server of remote desktop 2 communicating with each other to launch the application in remote desktop 2. In addition, inputs to the application made by the user (e.g., edits made to the file by the user) at step S11 are transmitted to remote desktop 2 through the connection between the seamless window client of desktop 1 and the seamless window server of remote desktop 2. Subsequently, the outputs of the application on remote desktop 1, which are generated based on the inputs made by the user, are transmitted to the remote desktop 1 for display by the remote desktop 1 through the connection between the seamless window client of desktop 1 and the seamless window server of remote desktop 2.

Step S15 of FIG. 4 represents a search being initiated by the user. In the example given herein, the user types in "excel" in the search bar of remote desktop 1. In response, remote desktop 1 performs a search of all applications installed in remote desktop 1 and of all stub applications representing the applications installed in the other remote desktops of the remote desktop pool. In response, at step S16, remote desktop 1 performs the requested search and generates the search result.

Figure 7:
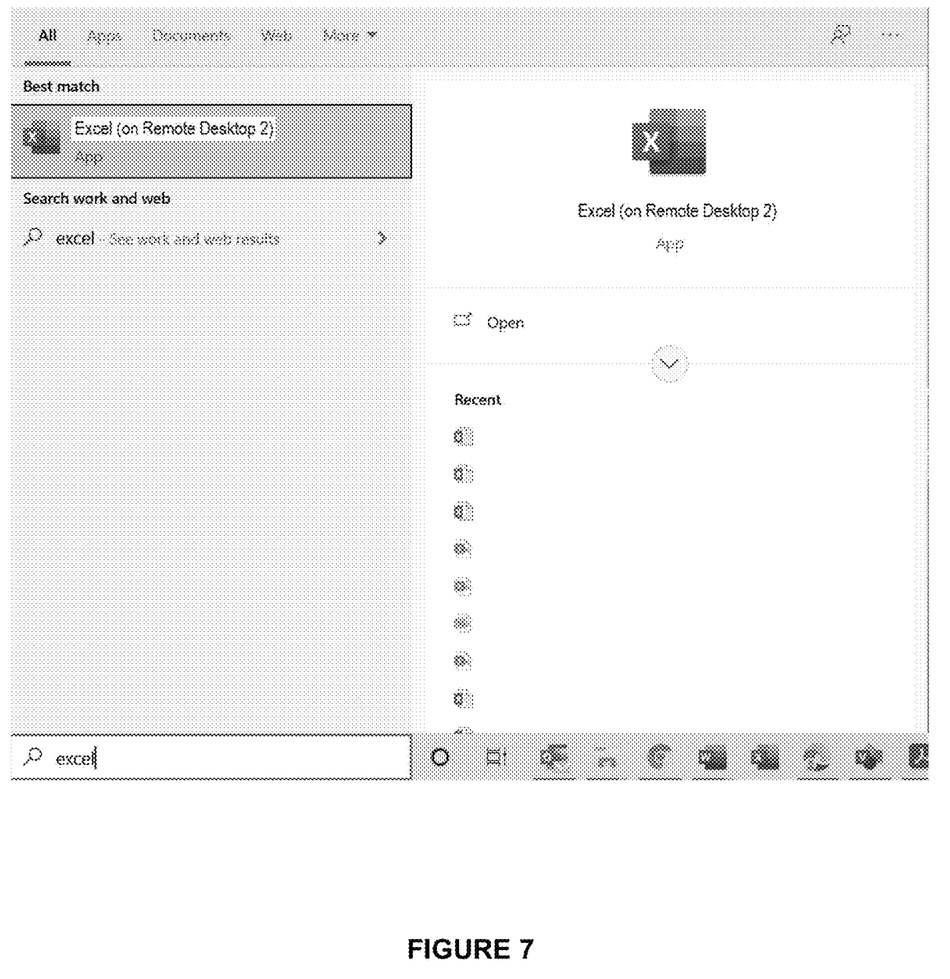
FIG. 7 is an example of an interface that is displayed in response to a user search performed on one of the remote desktops in the pool.

FIG. 7 is an example of an interface that is displayed in response to the user search performed by remote desktop 1. The applications that match the search term includes applications installed in remote desktop 1 and applications installed in other remote desktops in the remote desktop pool, which are represented by the stub applications created by the search association service of remote desktop 1. In the example of FIG. 7, the search results include only a single match to a Microsoft Excel® application in remote desktop 2 and the stub application corresponding to the Microsoft Excel® application in remote desktop 2 is displayed in the interface.

When the user clicks on a stub application that is listed in the search results at step S17, the remote desktop agent of remote desktop 1 at step S18 will call the seamless window client to initiate the process for launching and displaying the application in the other remote desktop (e.g., remote desktop 2) as described above.

Step 19 represents the end of the remote desktop session with remote desktop 1, which occurs when the user disconnects from remote desktop 1 at step 19. In response to the disconnection, remote desktop 1 at step S20 destroys all of the mappings to shared drives and folders.

As used herein, a "connection server" is any apparatus that is configured to manage connections to remote user sessions such as remote desktops and is also referred to as a "connection broker," and a "domain controller" is any apparatus that is configured to have access to and manage user log-in information.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of delivering remote desktop services from a pool of remote desktops that a user is entitled to access, wherein the pool of remote desktops includes a first remote desktop to which a remote desktop client of the user is currently connected and a second remote desktop, said method comprising:
   acquiring by the first remote desktop application data indicating applications that are installed in each of the remote desktops in the pool;
   detecting by the first remote desktop a user request received from the remote desktop client to launch an application;
   determining by the first remote desktop from the acquired application data that the application to be launched is installed in the second remote desktop;
   in response to said determining, establishing a connection between the first remote desktop and the second remote desktop to launch the application in the second remote desktop; and
   delivering outputs of the application by the first remote desktop to the remote desktop client based on inputs received by the first remote desktop from the remote desktop client, wherein
   the outputs of the application are generated by the application running in the second remote desktop based on the inputs received by the first remote desktop from the remote desktop client, and
   the outputs of the application and the inputs from the remote desktop client are exchanged between the first remote desktop and the second remote desktop through the established connection.

2. The method of claim 1, further comprising:
   registering a remote desktop agent running in the first remote desktop as a file handler for opening files with applications that are installed in the second remote desktop, wherein
   the remote desktop agent determines that the application to be launched is installed in the second remote desktop.

3. The method of claim 2, wherein
   each of the remote desktops is configured with a seamless window client and a seamless window server, and
   the seamless window client of the first remote desktop and the seamless window server of the second remote desktop communicate with each other to allow the first remote desktop to launch the application in the second remote desktop and display outputs of the application running in the second remote desktop in first remote desktop.

4. The method of claim 2, further comprising:
   creating application stubs on the first remote desktop based on the acquired data.

5. The method of claim 4 wherein
   the application data is collected and maintained by a connection server that communicates with each of the remote desktops in the pool to collect data on applications installed therein.

6. The method of claim 5, wherein the connection server authorizes the establishment of the connection between the first remote desktop and the second remote desktop to launch the application in the second remote desktop.

7. The method of claim 1, further comprising:
   retrieving drive configuration data indicating drives or folders that are shared by each of the remote desktops in the pool;
   detecting by the first remote desktop a user request received from the remote desktop client to open a shared drive or folder;
   determining by the first remote desktop using the retrieved drive configuration data that the shared drive or folder is mapped to the second remote desktop; and
   establishing a connection between the first remote desktop and the second remote desktop to acquire contents of the shared drive or folder.

8. The method of claim 7, wherein
   the drive configuration data is collected and maintained by a connection server that communicates with each of the remote desktops in the pool to collect individual drive configuration data from each of the remote desktops in the pool.

9. The method of claim 8, wherein
   the connection server authorizes the establishment of the connection between the first remote desktop and the second remote desktop to acquire contents of the shared drive or folder.

10. The method of claim 8, wherein
    the individual configuration data for each of the remote desktops in the pool is set by the remote desktop client.

11. A non-transitory computer readable medium having instructions stored therein which are executable by a processor to carry out a method of delivering remote desktop services from a pool of remote desktops that a user is entitled to access, wherein the pool of remote desktops includes a first remote desktop to which a remote desktop client of the user is currently connected and a second remote desktop, said method comprising:
    acquiring by the first remote desktop application data indicating applications that are installed in each of the remote desktops in the pool;
    detecting by the first remote desktop a user request received from the remote desktop client to launch an application;
    determining by the first remote desktop from the acquired application data that the application to be launched is installed in the second remote desktop;
    in response to said determining, establishing a connection between the first remote desktop and the second remote desktop to launch the application in the second remote desktop; and
    delivering outputs of the application by the first remote desktop to the remote desktop client based on inputs received by the first remote desktop from the remote desktop client, wherein
    the outputs of the application are generated by the application running in the second remote desktop based on the inputs received by the first remote desktop from the remote desktop client, and the outputs of the application and the inputs from the remote desktop client are exchanged between the first remote desktop and the second remote desktop through the established connection.

12. The non-transitory computer readable medium of claim 11, wherein the method further comprises:
registering a remote desktop agent as a file handler for opening files with applications that are installed in the second remote desktop, wherein
the remote desktop agent determines that the application to be launched is installed in the second remote desktop.

13. The non-transitory computer readable medium of claim 12, wherein
each of the remote desktops is configured with a seamless window client and a seamless window server, and
the seamless window client of the first remote desktop and the seamless window server of the second remote desktop communicate with each other to allow the first remote desktop to launch the application in the second remote desktop and display outputs of the application running in the second remote desktop in first remote desktop.

14. The non-transitory computer readable medium of claim 12, wherein the method further comprises:
creating application stubs on the first remote desktop based on the acquired data.

15. The non-transitory computer readable medium of claim 14 wherein
the application data is collected and maintained by a connection server that communicates with each of the remote desktops in the pool to collect data on applications installed therein.

16. The non-transitory computer readable medium of claim 11, wherein the method further comprises:
retrieving drive configuration data indicating drives or folders that are shared by each of the remote desktops in the pool;
detecting by the first remote desktop a user request received from the remote desktop client to open a shared drive or folder;
determining using the retrieved drive configuration data that the shared drive or folder is mapped to the second remote desktop; and
establishing a connection between the first remote desktop and the second remote desktop to acquire contents of the shared drive or folder.

17. The non-transitory computer readable medium of claim 16, wherein
the drive configuration data is collected and maintained by a connection server that communicates with each of the remote desktops in the pool to collect individual drive configuration data from each of the remote desktops in the pool.

18. A remote desktop computer system comprising:
a pool of remote desktops; and
a connection server configured to collect application data of applications installed in the remote desktops in the pool from the remote desktops in the pool and update the application data periodically, wherein
the connection server, upon updating the application data, pushes the updated application data to each of the remote desktops in the pool, and
each of the remote desktops, upon receiving the updated application data, creates file association for files thereof based on the updated application data, and creates stub applications based on the updated application data, wherein each of the stub applications corresponds to one of the applications installed on another remote desktop and a user click thereon causes the corresponding one of the applications to be launched in said another remote desktop, wherein
the connection server is configured to collect drive configuration data from the remote desktops in the pool, the drive configuration data indicating shared drives or folders in each of the remote desktops, and
each of the remote desktops is configured to create a mapping of the shared drives or folders based on the drive configuration data.

19. The remote desktop computer system of claim 18, wherein each of the remote desktops is configured with a seamless window client and a seamless window server, the seamless window client of a first remote desktop in the pool of remote desktops and the seamless window server of a second remote desktop in the pool of remote desktops communicating with each other to allow the first remote desktop to launch an application in the second remote desktop and display outputs of the application running in the second remote desktop in first remote desktop.

* * * * *